(12) United States Patent
Cardenas-Valencia et al.

(10) Patent No.: US 7,432,011 B2
(45) Date of Patent: Oct. 7, 2008

(54) ACTUATED ELECTROCHEMICAL POWER SOURCE

(75) Inventors: Andres M. Cardenas-Valencia, St. Petersburg, FL (US); Robert Frederick Benson, St. Petersburg, FL (US); Lawrence C. Langebrake, Seminole, FL (US); David P. Fries, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 331 days.

(21) Appl. No.: 10/318,981

(22) Filed: Dec. 13, 2002

(65) Prior Publication Data

US 2004/0115520 A1   Jun. 17, 2004

(51) Int. Cl.
*H01M 2/36* (2006.01)
*H01M 6/32* (2006.01)
*H01M 6/36* (2006.01)

(52) U.S. Cl. .............. 429/70; 429/52; 429/80; 429/112; 429/118

(58) Field of Classification Search ............ 429/12, 429/13, 14, 22, 23, 27, 63, 68, 103, 112, 429/113, 120, 127; 307/139, 140; 165/300
See application file for complete search history.

(56) References Cited

U.S. PATENT DOCUMENTS

| | | | |
|---|---|---|---|
| 4,650,732 A | 3/1987 | Weber | |
| 5,415,949 A * | 5/1995 | Stone et al. | 429/63 |
| 5,527,636 A | 6/1996 | Kao | |
| 5,536,592 A | 7/1996 | Celeste et al. | |
| 5,567,540 A | 10/1996 | Stone et al. | |
| 5,665,484 A * | 9/1997 | Bolger | 429/62 |
| 5,770,329 A | 6/1998 | Harney | |
| 6,203,939 B1 | 3/2001 | Wilson | |
| 6,345,502 B1 * | 2/2002 | Tai et al. | 60/512 |
| 6,358,638 B1 | 3/2002 | Rock et al. | |
| 6,403,244 B2 | 6/2002 | Faris et al. | |

FOREIGN PATENT DOCUMENTS

JP      52035841 A    *  3/1977

* cited by examiner

*Primary Examiner*—Jonathan Crepeau
*Assistant Examiner*—Robert Hodge
(74) *Attorney, Agent, or Firm*—Molly Sauter; Smith & Hopen, P.A.

(57) ABSTRACT

An actuated galvanic cell is described which generated electric current responsive to introduction of electrolyte from a secondary containment means. Also housed within the containment means is a propellant which serves to drive the electrolyte from the containment means into the reaction chamber for electric current production. This propellant system is chosen from thermal, phase change, and other systems which as opposed to physical pumps impel the electrolyte into the reaction chamber without the need for additional introduction apparatus.

15 Claims, 11 Drawing Sheets

ACTUATED ELECTROCHEMICAL POWER SOURCE

STATEMENT OF GOVERNMENT INTEREST

The work that led to this invention has been supported in part by a grant from the U.S. Army, Space and Missile Defense command through Grant DASG60-00-C-0089. Thus, the United States Government may have certain rights to this invention.

FIELD OF THE INVENTION

This invention relates to the field of electric power generation by galvanic cells. More specifically, the instant invention relates to the use of a novel actuation mechanism for initiation of the galvanic reactions within a power cell to produce electric current.

BACKGROUND OF THE INVENTION

Innovations in the miniaturation of both every-day-use electronic devices and specialized micro-electromechanical devices has led to the need for an efficient power supply in smaller scale. In addition, on-demand power supplies in various environments which benefit from delayed activation have become an area of attention with the increased exploration of space, underwater and remote locations. Further, optimizing the power to size ratio has become a goal for the power source development in all electronic devices from the very large to micro-electric mechanical (MEMS) devices. Not only does the increase in existing technology (cell phones, lap-top computers, etc.) demand small portable energy supplies, but also the development of real portable instrumentation such as sensors, biomedical diagnosis and operational devices, accentuates the need for scaling down the size of batteries or enhancing the operational efficiency of batteries to enhance their functional range.

Existing large and small power energy sources vary widely in design and principles of operation. Fuel cells, piezoelectric and thermal-to-electric conversion mechanisms, turbines, and chemical batteries are some of the power systems currently under study for a wide variety of applications. Within the framework of existing technology, galvanic electrochemical cells represent a readily fabricated, simple concept that does not require movable parts when operating and can be fabricated in any desired size.

One particular desirable feature in the galvanic power source is the ability to supply power on demand when it is needed, thus necessitating an actuation mechanism. This mechanism serves to both supply power when it is needed only but also enhances battery life by providing a means for preservation of the reactants within the power cell until such time as their consumption is actually required. In addition, with a precise actuation mechanism, the amount of power supplied may be regulated as well as the length of life of the system may be extended.

Various systems for effecting actuation have been developed over the years. One such mechanism is described in Kao, U.S. Pat. No. 5,527,636. In the Kao device, an actuation block of absorbent material fed from a reservoir of electrolyte by a filament which contacts the electrodes when power is desired. In order for control to be maintained in the system, the Kao device requires moving parts in the mechanical movement of the absorbent pads be made which requires moving parts which are impractical in many applications.

Another system that works from moving parts is described in U.S. Pat. No. 5,536,592 to Celeste et al. Here the actual anode and/or cathode are mechanically contacted with the electrolyte reservoir. The resultant control determined is by the rate at which the supply of electrode material is made available in the reservoir. Again, with mechanical moving parts required, the overall use of such a system is limited.

U.S. Pat. No. 6,403,244 to Faris et al is another example of a mechanical movable cathode type of cell with a system of sophisticated rollers advancing the cathode tape material through the system. Again, this structure is too complicated for many uses.

Another electrolye introduction means is described in Stone et al, U.S. Pat. No. 5,415,949. Here a sophisticated pump and control system circulate the electrolyte through the device. Included also are means for maintaining the integrity of the fluid itself as well as the by products of the chemical reaction which become recirculated in this system. Again, because of the complexity of this device, it is not suited for many applications.

A second Stone et al device disclosed in U.S. Pat. No. 5,567,540 also describes a pump structure with a solenoid valve to assist in the actuation. This valve, however, does not overcome the need for a simpler, less mechanically complicated system for delivery of the electrolyte to the reaction chamber.

The use of heat in the activation of the chemical reaction in fuel cells is also known in the art. One such example is Rock et al, U.S. Pat. No. 6,358,638. Here the membrane electrode assembly is preheated to enhance the start-up of the cells themselves. This is accomplished by a side exothermic reaction which has no effect on either the electrolyte system or the functioning of the cell after initial activation.

Wilson, U.S. Pat. No. 6,203,939, also discloses the use of heat in the operation of his battery system, however, this is related to a flux that is heated and then used to fuse to the electrodes to change their electrical properties.

U.S. Pat. No. 5,770,329 to Harney describes a heat-activated system in which the electrolyte is contained in a wafer which is heated to a molten state to activate the battery. Because of its location already being juxtaposed between the anode and cathode, this reference does not teach the use of a flow rate of the electolyte into the reaction chamber.

Finally, Weber, U.S. Pat. No. 4,650,732, discloses the use of heat for transfer of the electrolyte system from a remote reservoir to the cell. Here, the electrolyte is raised to a temperature sufficient for its use within the battery itself. With the increase in temperature, the electrolyte is able to flow at a more desired rate from its reservoir to the reaction chamber, but there is no disclosure that any elevated pressure is propelling that fluid in that flow path in a regulated fashion.

SUMMARY OF THE INVENTION

It is therefore an object of the invention to provide a system for initiation of the chemical reactions within a fuel cell or battery system which is heat pressure driven.

It is a further object of the invention to provide an initiation system for an electrochemical cell which is responsive to heating that provides a regulated stream of electrolyte to the reaction chamber.

It is still a further object of the invention to provide an electric current producing system that is regulated by the input of electrolyte into the reaction chamber.

It is another object of the invention to provide an electric current generator that is supplied with electrolyte via a pressure injection system that does not require pumping mechanisms or similar hardware systems.

It is a further object of the invention to provide a pressure injection system for electric current producing means that is applicable to both large and small or micro-system cells that delivers the ability of the electric generating means to be used in a wide variety of applications.

Still additional objects will become apparent as the invention is further described.

DETAILED DESCRIPTION OF THE PREFERRED EMBODIMENTS

The preferred embodiment of the current generation means of the instant invention effects actuation through an electrical heating means in contact with a working fluid. By use of a temperature liquid increment which expands, a micro fluidic stroke is generated which in turn leads to a thermo-electric-pneumatic action. By use of a micro fluidic system, the system is capable of steady power generation over the entire life of the battery system.

The instant system is applicable to a variety of fabrication techniques including, but not limited to, the standard Nickel Chromium deposition on silicon wafers as well as Copper resistors with or without protective tin overcoats. Industry accepted fabrication techniques as well as new fabrication techniques are acceptable for the materials employed in the instant system.

Aluminum chemistry is an attractive option as a battery material, due to the known advantages of aluminum electrodes in electrochemical cells. As an anode in a galvanic cell, aluminum possesses the properties to produce a large oxidation potential at a large current. Under standard conditions, it has a reversible energy density of 18.9 kJ/g or 51.0 kJ/cc as an anode in strong alkali media. Thus, in the preferred embodiment, the electrochemical cell chosen is an aluminum/air galvanic cell in an alkali media. In addition, the preferred embodiment is directed to a micro-fluidic type of device, but this is for illustration only, and other size systems are considered within the scope also of the instant invention.

In the instant device, the actuation mechanism chosen to start the battery is a high thermal-expansion liquid, sometimes referred to as thermo-pneumatic. In the preferred embodiment, the actuation liquid is a water immiscible, high temperature coefficient of expansion, and low heat capacity fluid, such as 3M fluoro-compound, FC 77, normally used as a coolant fluid in microelectronics. Other fluidic systems may also be used, including those employing membranes, depending on the chemical as well as environmental considerations for the use of the power generating system.

Figure 1:
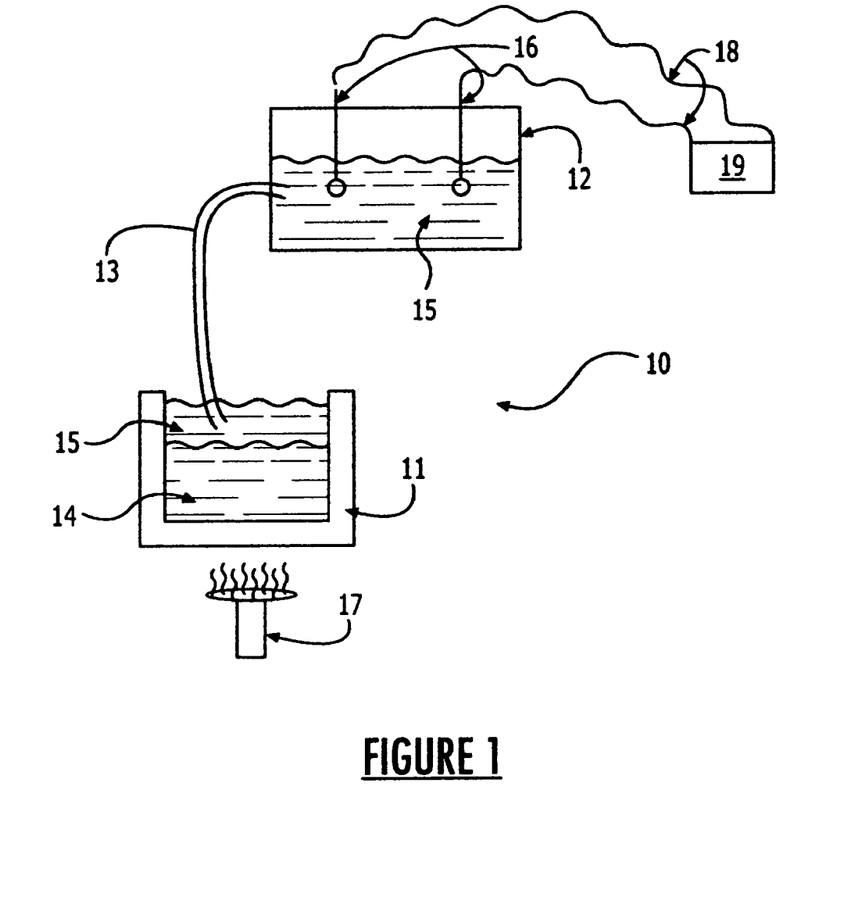
FIG. 1 represents an overall schematic of the battery system of the instant invention.

As shown in FIG. 1, the instant system 10 is comprised of a reservoir section 11 and a reaction chamber 12. A suitable conduit means 13 serves to provide fluid communication between the reservoir 11 and the reaction chamber 12. The conduit means 13 may be a valve means or a tube means or combination and the reservoir and the reaction chamber may be any distance apart from physically in contact with each other to being remotely separtated. Contained with the reservoir 11 are the actuation liquid 14 and the electrolyte 15. The reaction chamber 12 contains electrodes 16 and, when in operation, electrolyte 15. The electrodes 16 may be either a single pair or a plurality of electrode components including non-even sets. A suitable heating means 17 is disposed outside of the reservoir 11 for heating the actuation liquid 14. Suitable connection means 18 transfer the generated current to power device 19 or the device may be so configured to include direct input into the device to be powered.

In operation of the preferred embodiment, heating means 17 is used to heat the actuation fluid 14 which in turn drives electrolyte 15 into conduit means 13 and subsequently into reaction chamber 12. The current generated is then transferred to power device 19 via connection means 18.

Figure 2:
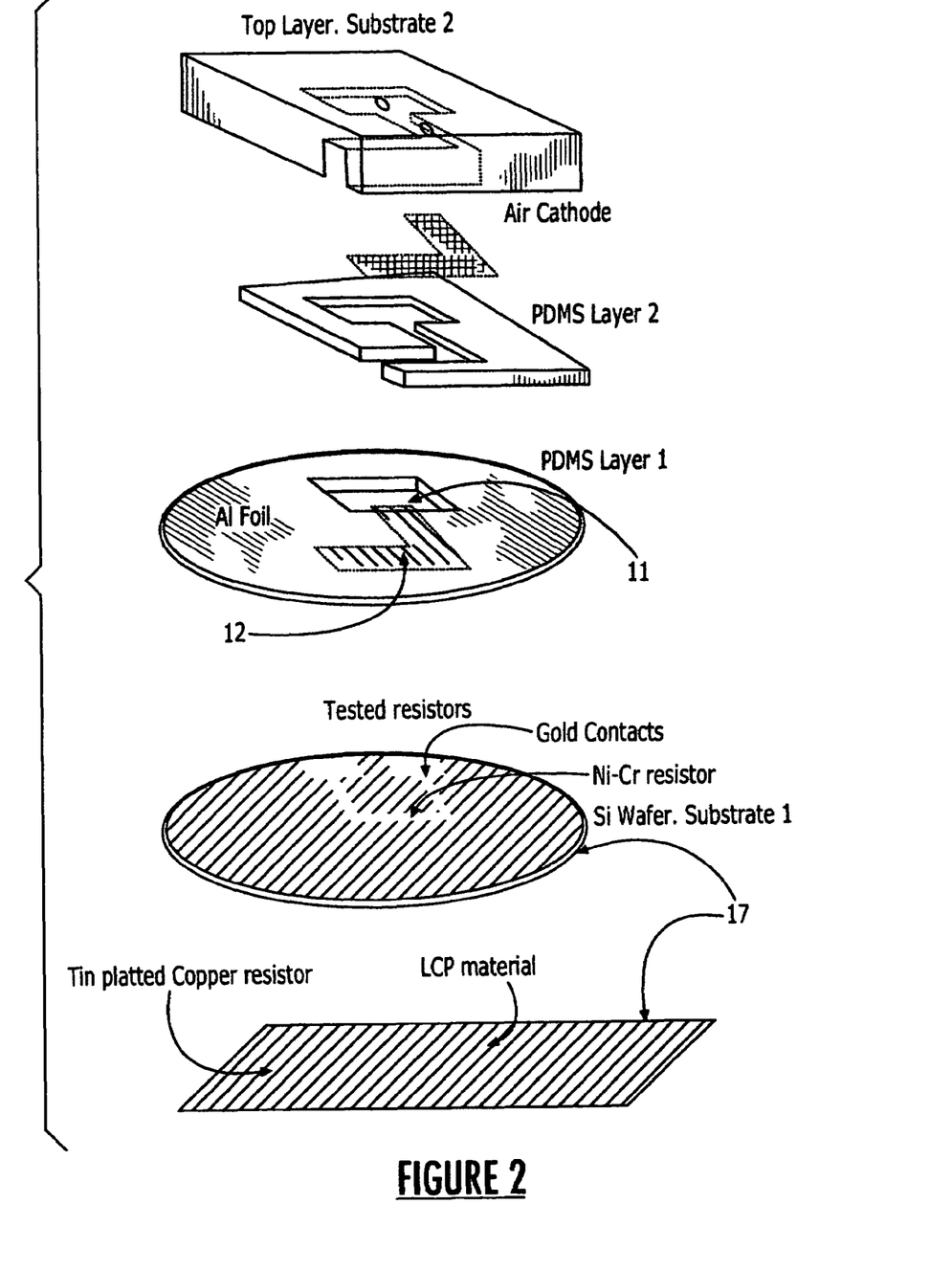
FIG. 2 shows a micro-fluidic embodiment of the device of FIG. 1.

A micro-fluidic embodiment of the instant invention is shown in FIG. 2. Since the performance of such a micro-fluidic actuated cell is dependent on the energy required to move a certain amount of fluid into the galvanic reservoir, the heating or driving mechanism is highly important. Two examples, are shown in FIG. 2, labeled as heating means 17, and corresponding to the heating means 17 shown in the overall schematic, FIG. 1. Layers of patterned materials are stacked to form the micro-fluidic cell. As shown in FIG. 2, the instant device is a compilation of polydimethylsiloxane (PDMS) layers joined together with the resistor layer and a top covering layer.

EXAMPLE 1

A micro-electronics cell was prepared in four steps, with the complete cell being a multi layer stack of three different substrate materials, which were aligned and bonded together as shown in FIG. 2. The fabrication parameters are listed in Table 1 below:

| Layer and materials | Layer thickness, μm |
|---|---|
| PDMS layer 1 | 500 |
| PDMS layer 2 | 80 |
| Channels thickness | 380 |

Fabrication of the Resistor Layers

Figure 5:
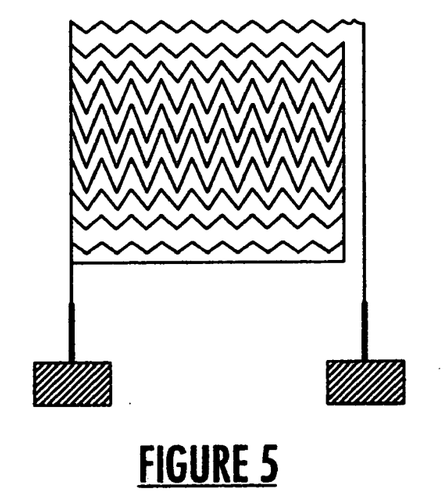
FIG. 5 is one example of a resistor design for the resistor layer.
Figure 6:
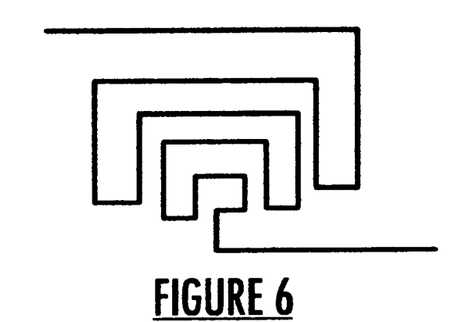
FIG. 6 is another example of a resistor design for the resistor layer.
Figure 7:
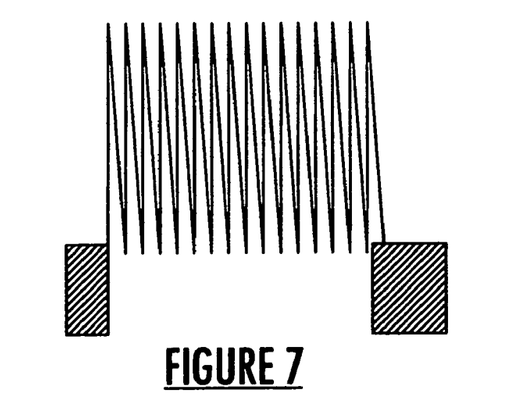
FIG. 7 is a further example of a resistor pattern for the resistor layer.

Two types of resistors were employed and subsequently compared as heaters for the thermal actuation layer. A Nickel-Chromium material patterned on a silicon wafer was fabricated using standard fabrication techniques. A second or alternative resistor layer, a Tin-plated Copper one, was manufactured using a maskless photolithography system with a liquid crystal polymer serving as the substrate material. Various patterns for the resistor circuit were devised and a few of the patterns are shown in FIGS. 5-7.

Two polydimethysiloxane layers formed the working layers of the cell structure per se with a top fabricated from polymethymethacrylate/glass forming the top layer. Within the structure itself, a rectangular reservoir of approximately 100 μl was made by cutting a portion of the layer out; this reservoir being adapted to hold 80 μl of the heat-responsive working fluid and 20 μl of the electrolytic fluid, in this instance, KOH.

The two siloxane layers were formed from Sylgard PDMS from Dow Corning. The precursor resin and curing agent were spun on a spinning device to form the uniform layer thicknesses and then the polymer was cured by heating to effect the polymerization and to render the subsequent layer structure inert to the solvents of interest in the battery cell per se. These two layers in the final form were thermally attached to each other by curing a thin layer of resin between them.

Figure 3:
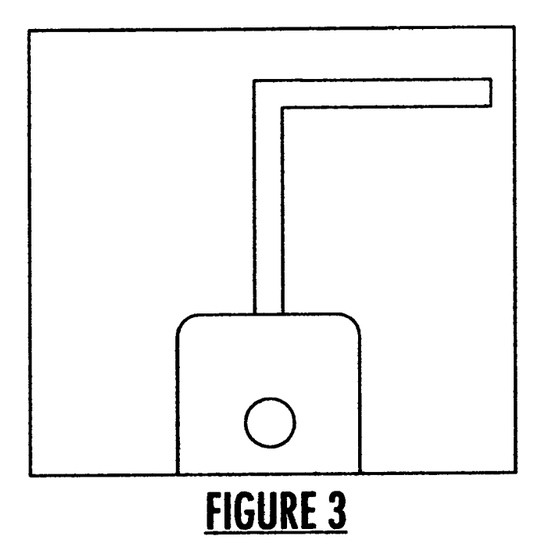
FIG. 3 shows the micro system of FIG. 2 as a coating on an additional glass slide to enhance the detail of the reservoir, filling holes and channels.
Figure 4:
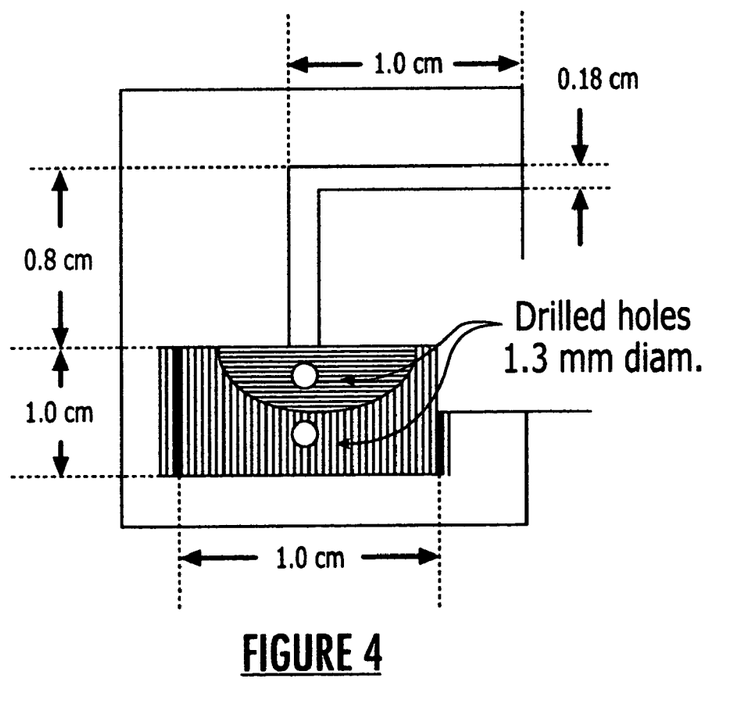
FIG. 4 is a scale depiction of the device of FIG. 2 showing the relative dimensions of the device of FIG. 2.

The device was formed with the working fluid, in this case the FC 77, as shown in FIG. 3, and then filled via filling hole 41 with the KOH. An additional hole 42 served as a vent hole for evacuation of the enclosed air displaced by the electrolyte. A schematic representation of the dimensions of the device as pertains to the reservoir structure is shown in FIG. 4.

The top layer was fabricated using both soft borosilicate glass, namely Corning microscope glass slides, and a piece of polymethylmethacrylate (PMMA) ⅛" in thickness. The reaction chamber 12 which was comprised of a plurality of microchannels as shown in FIG. 2 were formed by etching in the glass top layer and by machining in the PMMA version of the top layer.

Thermal Cell Activation

Figure 8:
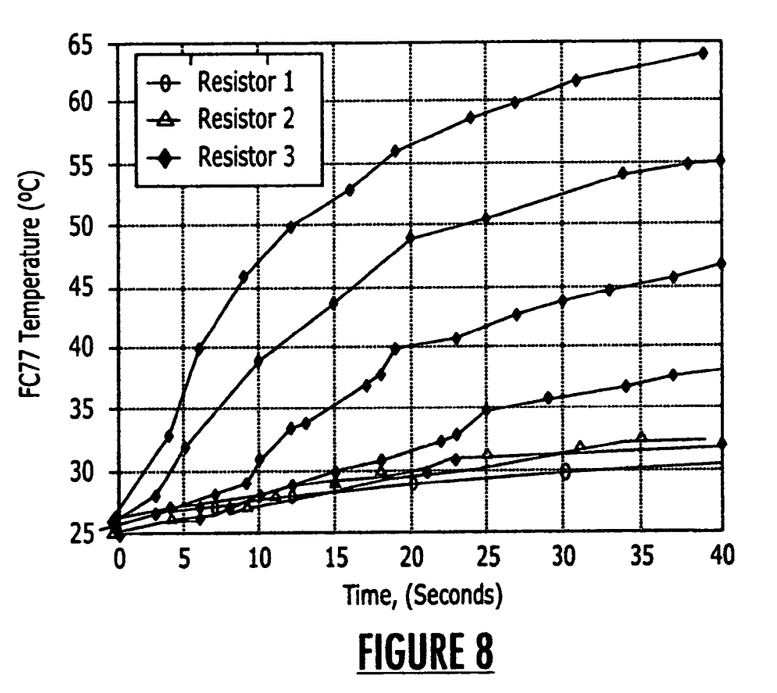
FIG. 8 is a plot of the temperature of the working fluid reservoir as a function of time for Nickel-Chromium resistor patterns.
Figure 9:
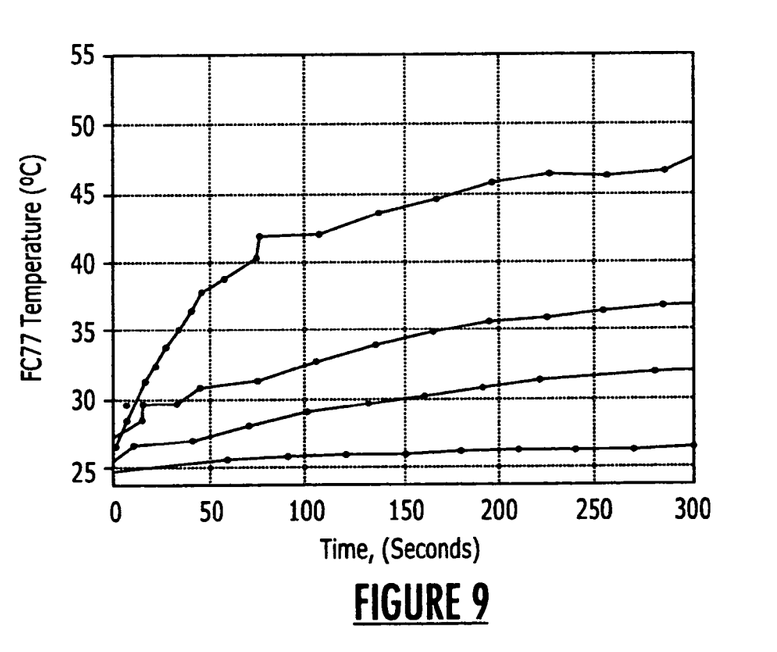
FIG. 9 is a plot of the temperature of the working fluid reservoir as a function of time for the Copper-Tin resistors.

The various resistor designs were tested to determine the temperature increase of the working fluid as a function of the input electric power. This was accomplished by measuring the temperature increments using a temperature probe and plotting the increase vs. time. The results for various resistor patterns are shown in FIG. 8 for the Nickel-Chromium resistor patterns and in FIG. 9 for the Copper coated with tin patterns. The comparison of the results showed that the resistor design had a definite effect on the heating power: the larger the pattern in terms of coverage and number of conductive lines, the better the generation of power into the working fluid system.

Cell Energy Output Determinations

It is well known that the cell performance of an electrochemical cell depends on the power that is withdrawn from it. In order to characterize a cell of this nature a polarization curve is required. This curve shows the values of a unit area cell potential as certain current is drawn from it. As more current is drawn from the cell over-potentials take place thus reducing the effective voltage produced. Hence, the polarization curve depends on the chemicals and their concentrations used. This relationship is unique and defines the performance of the particular cell. Since the active cell area and the load imposed on the cell determines the current available, a characterization can be made of the battery performance.

Figure 10:
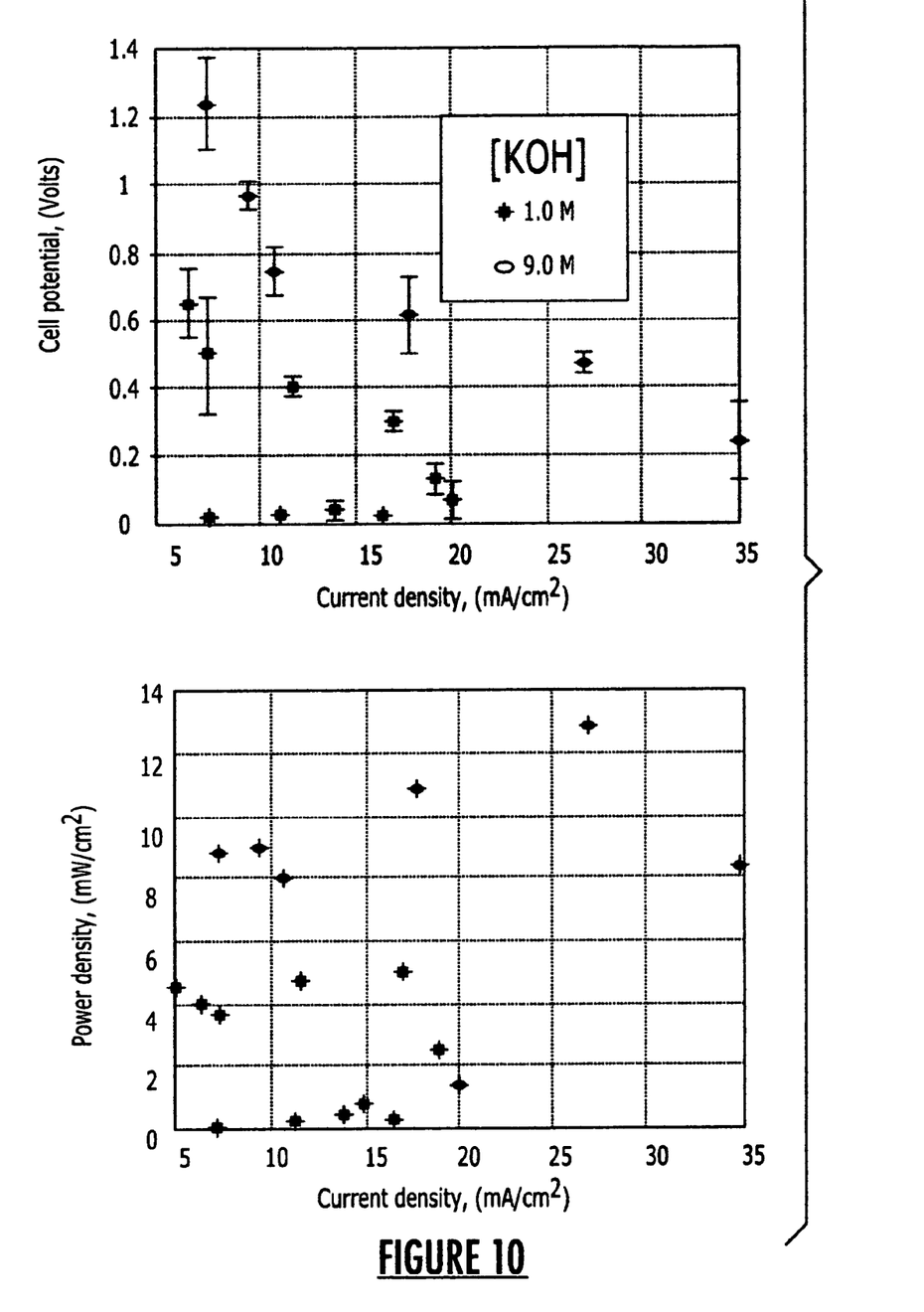
FIG. 10 are the plots of the values of the average voltage factored with time under different loads showing the polarization current vs. current density and the power density vs. current density.
Figure 11:
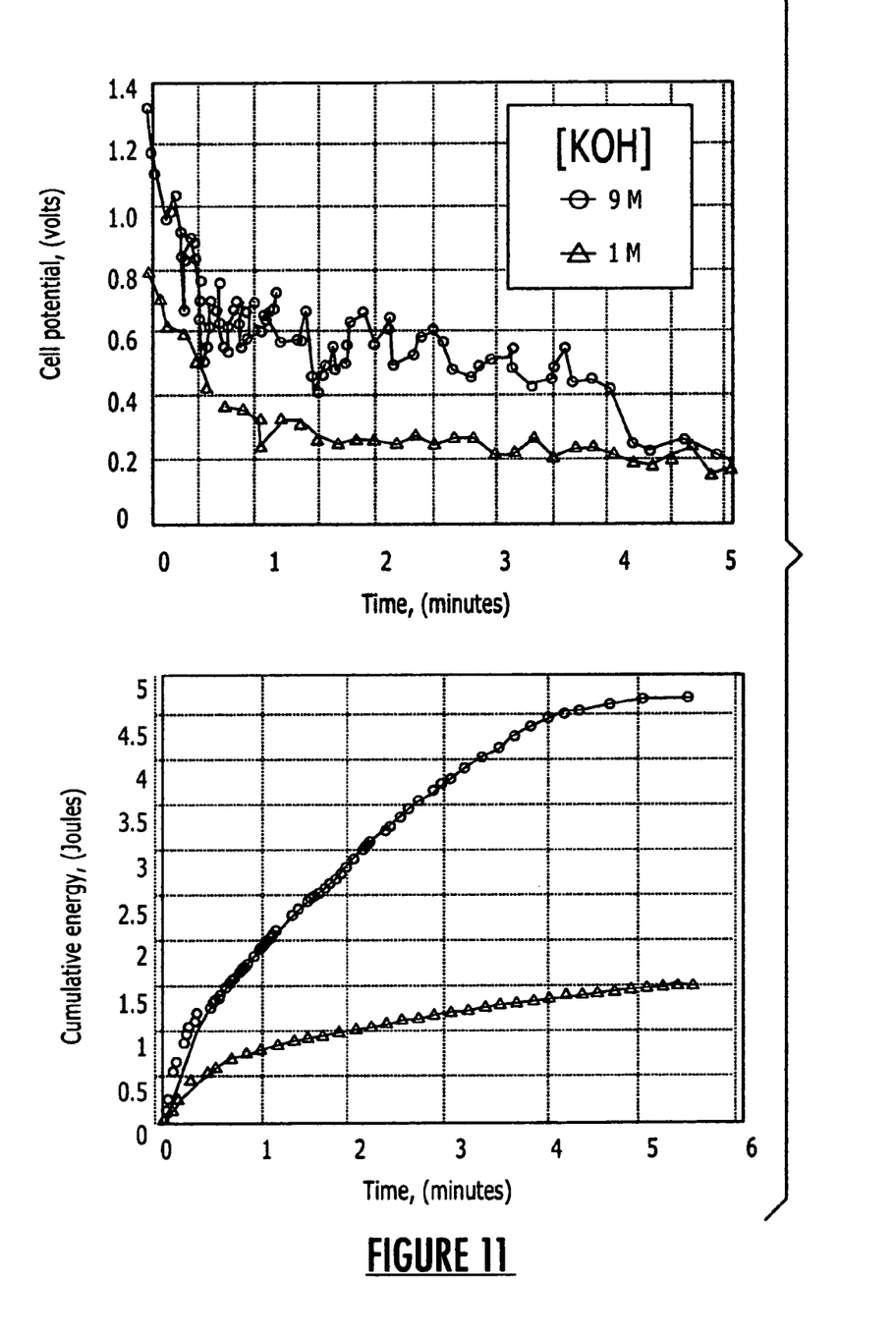
FIG. 11 is plots of the cell potentials vs. time and cumulative energy vs. time for the two electrolyte concentrations.

Various micro-cells were fabricated and their output voltage was recorded as a function of time when subjected to a variety of loads ranging from 1 ohm to 494 ohms. The cell potential results obtained as a function of time vary in a non-steady manner as expected since batch reactions take place and no new reagents are introduced into the system. Plots of the results of these studies are shown in FIGS. 10 and 11.

An average voltage was calculated for the time during imposition of a different load. Based on the average and the resistor used, the load cell current was then calculated. FIG. 10 is a compilation of those values with respect to results obtained for two differing concentrations of the KOH electrolyte. The voltage error bars are constructed with the standard deviation of the time dependent voltage values obtained while the cell was under load and represents a 95% confidence in the data if the variability is normally distributed. Error bars, corresponding to two standard deviations variability for the power were calculated using error propagation analysis.

In order to have an idea of the time dependence of the performance of the micro-cell, results of voltage vs time were presented for constant loads of 100 and 20 ohms. The aluminum anodes were totally consumed in the cases when the 9 M KOH was used but not in the instances where the 1 M concentration was chosen. In addition, the cell potentials for the 9 M systems were higher than those of the 1 M counterparts, but it was determined that the cell efficiency was considerably less in the higher concentration cell due to the fact that deleterious side reactions occur with the higher molar amounts.

Figure 12:
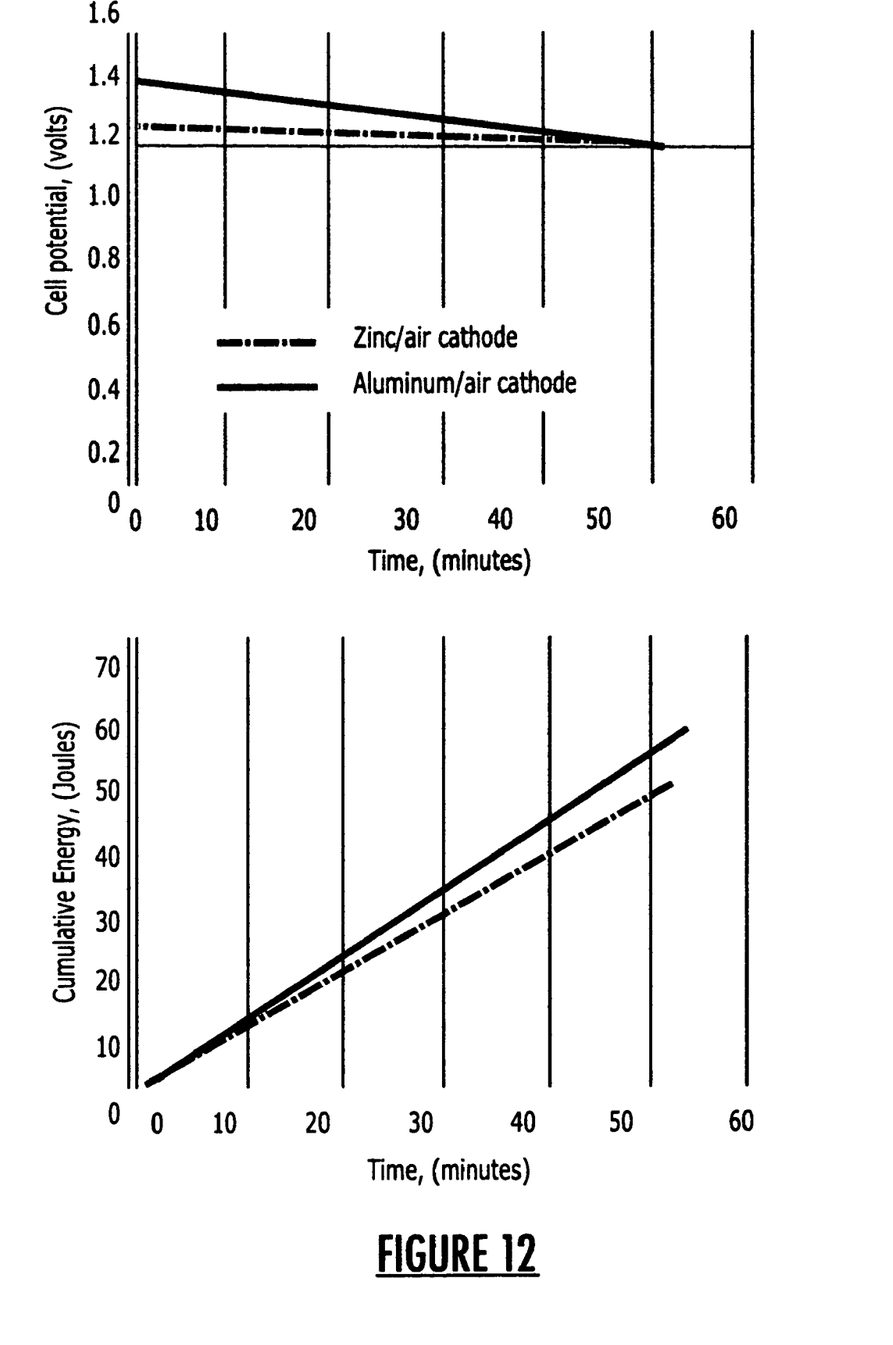
FIG. 12 is plots of the comparison data of the conventional Zn/Air battery and the Al/Air battery of the instant invention.

In addition, a comparison of the cell of the instant invention and that of a commercially available zinc/air battery was made. Both cells had an area of 1 cm$^2$ and were subjected to a 100 ohm load. The comparison results are depicted graphically in FIGS. 12. From these results is shows that the cells of the instant invention are effective as chip power supplies.

EXAMPLE 2

Figure 13:
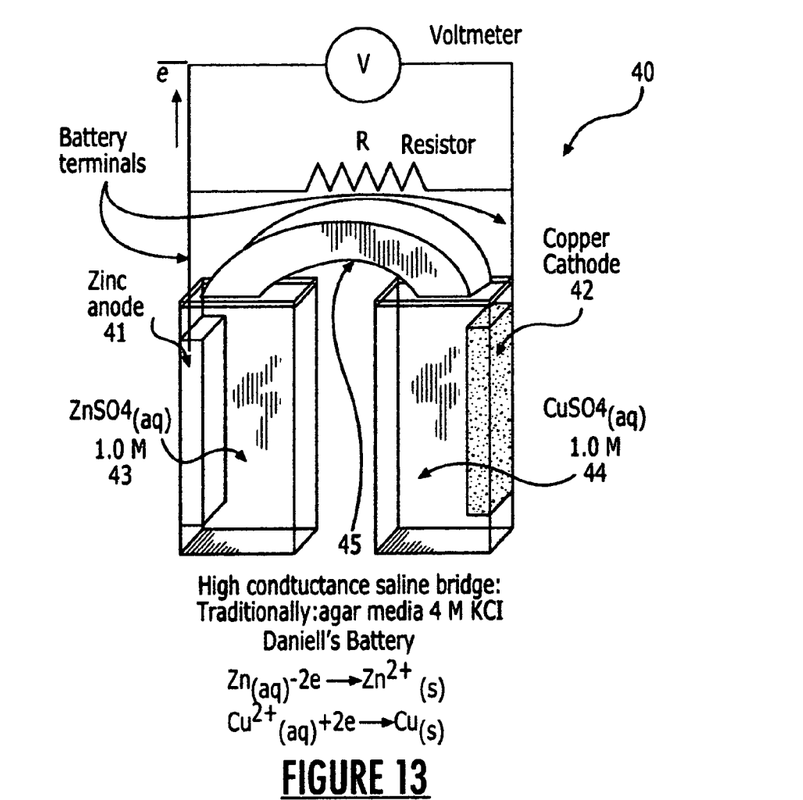
FIG. 13 is a schematic of a Daniell's battery structure.

A second micro-cell was fabricated to simulate the type of cell commonly referred to as a Daniell's Battery. A schematic of this type of battery is shown in FIG. 13. In this cell assembly 40 contains a zinc anode 41 and a copper cathode 42; these being contained in aqueous sulfate solutions of zinc sulfate 43 and copper sulfate 44. When activated, the electrolytes flow across a saline bridge 45 into the opposing electrolyte chamber to effect the electron flow.

Figure 14:
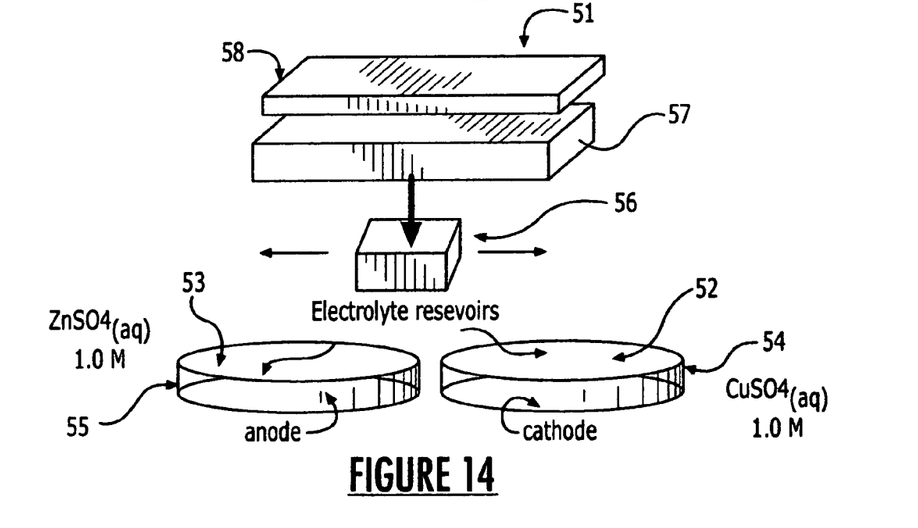
FIG. 14 is a further embodiment of the instant invention incorporating a Daniell's type of structure.

FIG. 14 shows a more detailed schematic of a micro-system using the Daniell's model 51. In this embodiment of the instant device, there are two electrolyte reservoirs 52 and 53 housed within the cathode section 54 and anode section 55. The bridge member 56 serves to complete the ion exchange function of the cell 51 when activated by the activation means, in this case a resistor layer 58. This activation is accomplished by the flow of a fluid contained in another reservoir 57 by the methods of the instant invention, and in the case of this example, this being by heating to force a fluid into the bridge member 56 to complete the flow channel and allow the exchange of ions to occur. Because the amount of fluid necessary to effect this path completion is small, little energy is required to activate the system, making this a highly efficient embodiment of the invention. Any suitable material for the bridge member 56 may be used; for the purposes of this example, a polyacrylamide bridge was employed.

Figure 15:
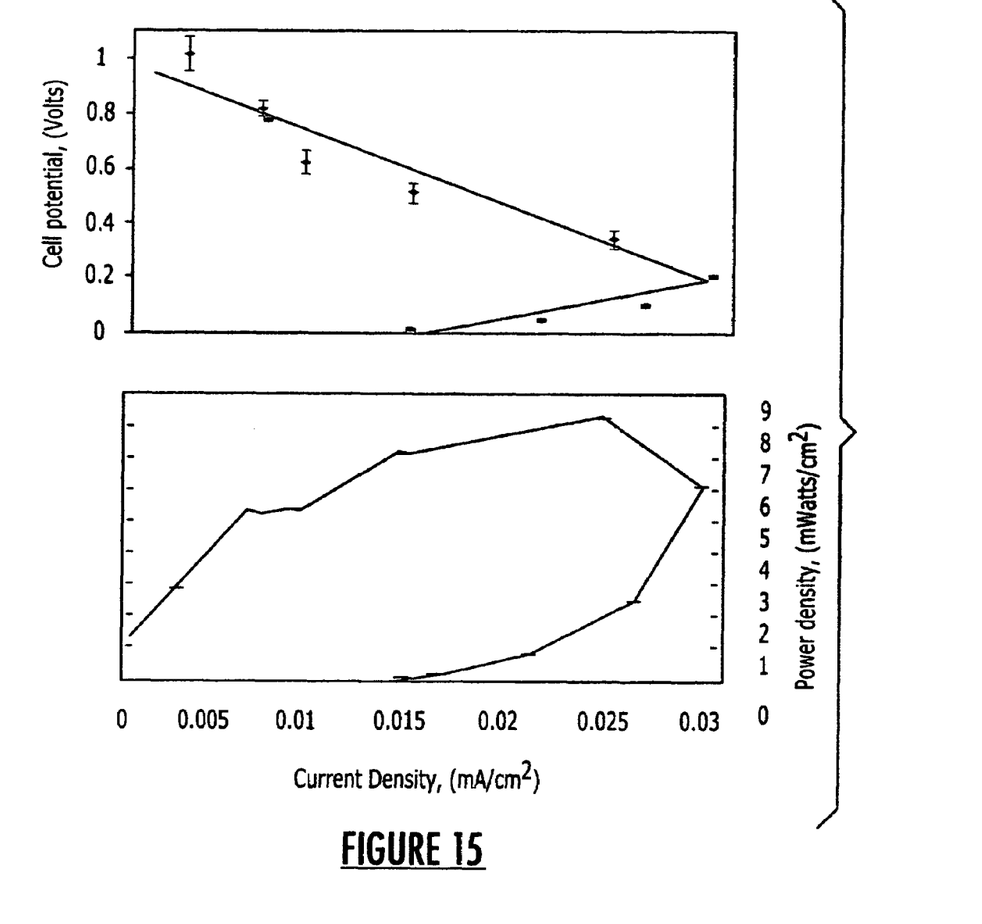
FIG. 15 shows the performance characteristics of the embodiment of FIG. 14.

Even though Daniell's cells heretofore have not been desirable as energy sources, in miniature they have proven to be efficient sources of current and have therefore proven highly useful. FIG. 15 shows the performance characteristics of the Daniell's embodiment of the instant invention.

Figure 16:
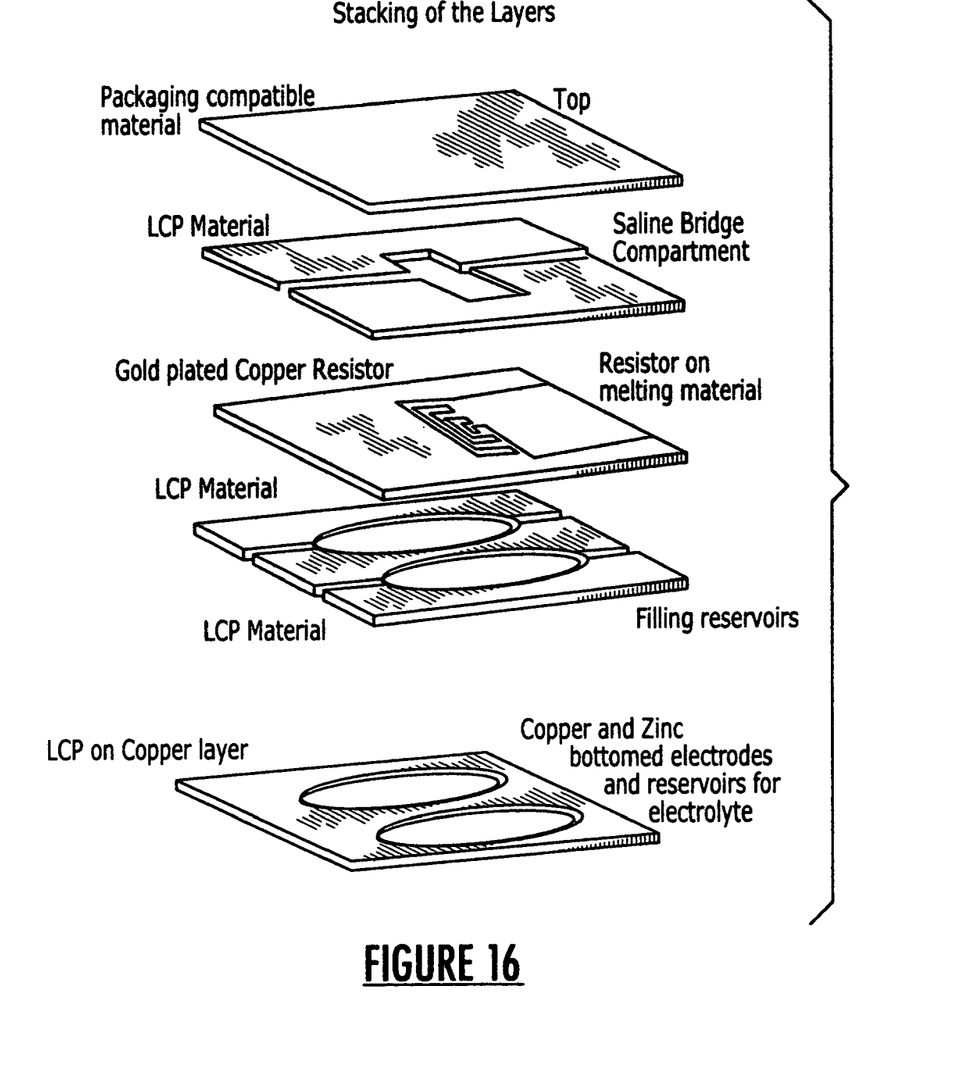
FIG. 16 is a representation of the layer structure of FIG. 14.

FIG. 16 is a schematic representing the layer structure of the Daniell's embodiment. The layers are similar to those of Example 1 but containing the additional reservoirs for the electrode/electrolyte combinations.

In addition to the size and structural characteristics of the embodiment of the Example and the preferred embodiment already disclosed herein, various modifications may be made to the system 10. In addition to a liquid-based working fluid system, modifications may be made to include any form of expansible material such as swellable gel systems. Polyacrylamide gels and other hydrogel systems may be used which when expanded, for instance when contacted by liquid media, force the electrolyte from the reservoir 11 into the reaction chamber 12 without the need for any form of heating to effect this movement. Indeed, combination systems which incorporate both are considered within the scope of ordinary skill in the art.

In addition, the heating means may be a chemical system as opposed to an electrical system. One such chemical system which is well-known in the medical arts is used for instant hot packs. Also contemplated are the use of materials that undergo phase changes, decomposition or any changes which cause latent heat to be emitted.

In the case of underwater applications, use of pressure differentials to force the flow of the electrolyte are considered replacement equivalents to the resistor heating described in the working Example herein. The working fluid in such instance may actually be ingressing external water which as a result of its elevated pressure when introduced into the system forces the electrolyte to advance into the reaction chamber 12. Indeed, any system which increases physical size of the working material, whether solid, liquid or gaseous in nature, may be substituted into the framework of the instant invention to provide the impelling impetus for transfer of the electrolyte into the reaction chamber 12.

Additionally, any current generating system may replace the Al anode/Air cathode system disclosed in the working Example. These systems are well-known in the art and readily available to the ordinary skilled artisan. The substrate and top layer materials are also considered conventional and easily replaced with other known variations.

Modification and variation can be made to the disclosed embodiments of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims it should be understood that changes may be made without departing from the essence of this invention. In this regard it is intended that such changes would still fall within the scope of the present invention. Therefore, this invention is not limited to the particular embodiments disclosed, but is intended to cover modifications within the spirit and scope of the present invention as defined in the appended claims.

We claim:

1. An electrochemical power source comprising:
   a reservoir containing an electrolytic solution and an actuating fluid;
   a reaction chamber containing an electrode for generation of an electrical current responsive to a chemical reaction between the electrode and the electrolytic solution;
   a conduit providing communication for the electrolytic solution between the reservoir and the reaction chamber; and
   an activation mechanism to cause the actuating fluid to physically expand, wherein the physical expansion of the actuating fluid propels the electrolytic solution from the reservoir through the conduit to the reaction chamber.

2. The electrochemical power source according to claim 1 wherein the activation mechanism is user-controlled.

3. The electrochemical power source according to claim 1 wherein the activation mechanism is a thermal system adapted to alter the temperature of the actuating fluid causing the actuating fluid to physically expand.

4. The electrochemical power source according to claim 1 wherein the actuating fluid is a heat-responsive actuating fluid whereby thermal heating of the actuating fluid causes the actuating fluid to physically expand.

5. The electrochemical power source according to claim 4 wherein the heat-responsive actuating fluid is a thermoexpansive liquid.

6. The electrochemical power source according to claim 5 wherein the thermoexpansive liquid is a perfluorinated liquid.

7. The electrochemical power source according to claim 1 wherein the conduit is a valve whereby the valve opens in response to pressure generated by the expansion of the actuating fluid enabling the electrolytic solution to pass through the conduit.

8. The electrochemical power source according to claim 1 wherein the conduit is a polyacrylamide bridge.

9. An electrochemical power source comprising:
   a reservoir containing an electrolytic solution and an expansible material;
   a reaction chamber containing an electrode for generation of an electrical current responsive to a chemical reaction between the electrode and the electrolytic solution; and
   a conduit providing communication for the electrolytic solution between the reservoir and the reaction chamber; and
   an activation mechanism to cause the expansible material to physically expand, wherein the physical expansion of the expansible material propels the electrolytic solution from the reservoir through the conduit to the reaction chamber.

10. The electrochemical power source according to claim 9 wherein the activation mechanism is electrically generated heat.

11. The electrochemical power source according to claim 9 wherein the activation mechanism is chemically generated heat.

12. The electrochemical power source according to claim 9 wherein the activation mechanism is a phase change in the expansible material resulting in the generation of latent heat.

13. The electrochemical power source according to claim 9 wherein the expansible material is a gel.

14. The electrochemical power source according to claim 9 wherein the activation mechanism is user-controlled.

15. The electrochemical power source according to claim 9 wherein the expansible material has a physical state selected from the group consisting of gel, solid, fluid, gaseous and vapor.

* * * * *